(12) United States Patent
Izdepski et al.

(10) Patent No.: US 8,806,530 B1
(45) Date of Patent: Aug. 12, 2014

(54) DUAL CHANNEL PRESENCE DETECTION AND CONTENT DELIVERY SYSTEM AND METHOD

(75) Inventors: Erich Izdepski, Falls Church, VA (US); M. Jeffrey Stone, Overland Park, KS (US); Sei Y. Ng, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 405 days.

(21) Appl. No.: 12/107,762

(22) Filed: Apr. 22, 2008

(51) Int. Cl.
*H04N 7/10* (2006.01)
*H04N 7/025* (2006.01)
*H04N 7/16* (2011.01)
*H04N 21/258* (2011.01)
*H04N 21/431* (2011.01)
*H04N 21/4363* (2011.01)

(52) U.S. Cl.
CPC ............ *H04N 21/258* (2013.01); *H04N 21/431* (2013.01); *H04N 21/43637* (2013.01)
USPC ............................................. 725/34; 725/141

(58) Field of Classification Search
CPC .............. H04N 21/258; H04N 21/431; H04N 21/43637
See application file for complete search history.

(56) References Cited

U.S. PATENT DOCUMENTS

| | | |
|---|---|---|
| 5,038,211 A | 8/1991 | Hallenbeck |
| 5,264,933 A | 11/1993 | Rosser et al. |
| 5,721,827 A | 2/1998 | Logan et al. |
| 5,732,216 A | 3/1998 | Logan et al. |
| 5,774,170 A | 6/1998 | Hite et al. |
| 5,892,536 A | 4/1999 | Logan et al. |
| 5,892,554 A | 4/1999 | DiCicco et al. |
| 5,926,624 A | 7/1999 | Katz et al. |
| 6,006,257 A | 12/1999 | Slezak |
| 6,055,566 A | 4/2000 | Kikinis |
| 6,169,542 B1 | 1/2001 | Hooks et al. |
| 6,240,555 B1 | 5/2001 | Shoff et al. |
| 6,282,713 B1 | 8/2001 | Kitsukawa et al. |
| 6,351,736 B1 | 2/2002 | Weisberg et al. |
| 6,463,468 B1 | 10/2002 | Buch et al. |
| 6,553,222 B1 | 4/2003 | Weiss |
| 6,578,070 B1 | 6/2003 | Weaver et al. |
| 6,615,408 B1 | 9/2003 | Kaiser et al. |
| 6,698,020 B1 | 2/2004 | Zigmond et al. |
| 6,718,551 B1 | 4/2004 | Swix et al. |
| 6,795,702 B2 | 9/2004 | Sennett |

(Continued)

FOREIGN PATENT DOCUMENTS

WO     0237828 A2     5/2002

OTHER PUBLICATIONS

Delker, Jason R., et al., "Method for Providing Personalized, Targeted Advertisements During Playback of Media," U.S. Appl. No. 11/850,029, filed Sep. 4, 2007.

(Continued)

*Primary Examiner* — Mark D Featherstone

(57) ABSTRACT

A dual channel communication system for detecting customer presence is provided. The system comprises a fixed component configured to receive a media content over a first channel, at least one mobile component configured to receive a targeted content based on a media related to the media content over a second channel, and a service provider that sends the media content and the targeted content. The fixed component detects the mobile component presence within proximity range using a short range wireless connection.

12 Claims, 5 Drawing Sheets

(56) References Cited

U.S. PATENT DOCUMENTS

| | | | |
|---|---|---|---|
| 7,006,881 B1 | 2/2006 | Hoffberg et al. | |
| 7,051,357 B2 | 5/2006 | Carr | |
| 7,134,132 B1 | 11/2006 | Ngo et al. | |
| 7,178,158 B2 | 2/2007 | Nishina et al. | |
| 7,206,748 B1 | 4/2007 | Gruse et al. | |
| 7,412,484 B1 | 8/2008 | Kikinis | |
| 7,444,659 B2 | 10/2008 | Lemmons | |
| 7,483,964 B1 | 1/2009 | Jackson et al. | |
| 7,509,178 B2 | 3/2009 | Logan et al. | |
| 7,519,273 B2 | 4/2009 | Lowthert et al. | |
| 7,568,213 B2 | 7/2009 | Carhart et al. | |
| 7,624,337 B2 | 11/2009 | Sull et al. | |
| 7,779,438 B2 | 8/2010 | Davies | |
| 7,831,243 B2 | 11/2010 | Thomas | |
| 8,010,418 B1 | 8/2011 | Lee | |
| 8,046,803 B1 | 10/2011 | Lee | |
| 8,060,407 B1 | 11/2011 | Delker et al. | |
| 8,204,073 B1 | 6/2012 | Gailloux et al. | |
| 8,462,677 B1 | 6/2013 | Gailloux et al. | |
| 8,606,637 B1 | 12/2013 | Delker et al. | |
| 2001/0001159 A1 | 5/2001 | Ford | |
| 2001/0047298 A1 | 11/2001 | Moore et al. | |
| 2002/0007493 A1 | 1/2002 | Butler et al. | |
| 2002/0083445 A1 | 6/2002 | Flickinger et al. | |
| 2002/0087402 A1 | 7/2002 | Zustak et al. | |
| 2002/0100045 A1 | 7/2002 | Rafey et al. | |
| 2002/0120925 A1 | 8/2002 | Logan | |
| 2002/0131511 A1 | 9/2002 | Zenoni | |
| 2002/0144262 A1 | 10/2002 | Plotnick et al. | |
| 2002/0147987 A1 | 10/2002 | Reynolds et al. | |
| 2002/0169540 A1 | 11/2002 | Engstrom | |
| 2002/0174425 A1 | 11/2002 | Markel et al. | |
| 2003/0001846 A1 | 1/2003 | Davis et al. | |
| 2003/0011477 A1* | 1/2003 | Clapper | 340/573.1 |
| 2003/0028873 A1 | 2/2003 | Lemmons | |
| 2003/0037335 A1 | 2/2003 | Gatto et al. | |
| 2003/0070182 A1 | 4/2003 | Pierre et al. | |
| 2003/0073411 A1 | 4/2003 | Meade, II | |
| 2003/0093790 A1 | 5/2003 | Logan et al. | |
| 2003/0093794 A1 | 5/2003 | Thomas et al. | |
| 2003/0110130 A1 | 6/2003 | Pelletier | |
| 2003/0126597 A1* | 7/2003 | Darby et al. | 725/32 |
| 2003/0135853 A1 | 7/2003 | Goldman et al. | |
| 2003/0149975 A1 | 8/2003 | Eldering et al. | |
| 2003/0149983 A1 | 8/2003 | Markel | |
| 2003/0158780 A1 | 8/2003 | Isobe et al. | |
| 2003/0163815 A1 | 8/2003 | Begeja et al. | |
| 2003/0226142 A1 | 12/2003 | Rand | |
| 2004/0006767 A1 | 1/2004 | Robson et al. | |
| 2004/0034874 A1 | 2/2004 | Hord et al. | |
| 2004/0073915 A1* | 4/2004 | Dureau | 725/9 |
| 2004/0194131 A1 | 9/2004 | Ellis et al. | |
| 2004/0261100 A1 | 12/2004 | Huber et al. | |
| 2005/0009525 A1* | 1/2005 | Evslin | 455/445 |
| 2005/0120391 A1 | 6/2005 | Haynie et al. | |
| 2005/0137958 A1 | 6/2005 | Huber et al. | |
| 2006/0015409 A1 | 1/2006 | Kato et al. | |
| 2006/0092966 A1 | 5/2006 | Sitnik et al. | |
| 2006/0126556 A1 | 6/2006 | Jiang et al. | |
| 2006/0136399 A1 | 6/2006 | Conwell et al. | |
| 2006/0168630 A1 | 7/2006 | Davies | |
| 2006/0218577 A1 | 9/2006 | Goodman et al. | |
| 2006/0259930 A1 | 11/2006 | Rothschild | |
| 2006/0265657 A1 | 11/2006 | Gilley | |
| 2007/0067267 A1 | 3/2007 | Ives | |
| 2007/0078944 A1 | 4/2007 | Charlebois et al. | |
| 2007/0130015 A1 | 6/2007 | Starr et al. | |
| 2007/0135087 A1 | 6/2007 | Villevieille et al. | |
| 2007/0157247 A1 | 7/2007 | Cordray et al. | |
| 2007/0186228 A1 | 8/2007 | Ramaswamy et al. | |
| 2007/0204310 A1 | 8/2007 | Hua et al. | |
| 2007/0214476 A1 | 9/2007 | Zalewski et al. | |
| 2007/0226761 A1 | 9/2007 | Zalewski et al. | |
| 2007/0250901 A1 | 10/2007 | McIntire et al. | |
| 2007/0276729 A1 | 11/2007 | Freer | |
| 2007/0294773 A1 | 12/2007 | Hydrie et al. | |
| 2008/0009268 A1 | 1/2008 | Ramer et al. | |
| 2008/0040768 A1 | 2/2008 | Robotham | |
| 2008/0103886 A1 | 5/2008 | Li et al. | |
| 2008/0109843 A1* | 5/2008 | Ullah | 725/34 |
| 2008/0148320 A1* | 6/2008 | Howcroft | 725/61 |
| 2008/0153413 A1 | 6/2008 | Li et al. | |
| 2008/0189736 A1 | 8/2008 | Edwards et al. | |
| 2008/0227467 A1 | 9/2008 | Barnes et al. | |
| 2008/0256572 A1 | 10/2008 | Chen | |
| 2008/0262958 A1 | 10/2008 | Ku et al. | |
| 2008/0276270 A1 | 11/2008 | Kotaru et al. | |
| 2008/0294694 A1 | 11/2008 | Maghfourian et al. | |
| 2008/0304805 A1 | 12/2008 | Baharav et al. | |
| 2008/0319828 A1 | 12/2008 | Southam et al. | |
| 2009/0083815 A1 | 3/2009 | McMaster et al. | |
| 2009/0171721 A1 | 7/2009 | LeBaron et al. | |
| 2009/0171787 A1 | 7/2009 | Mei et al. | |
| 2009/0210898 A1 | 8/2009 | Childress et al. | |
| 2009/0228922 A1 | 9/2009 | Haj-khalil et al. | |
| 2009/0328095 A1 | 12/2009 | Vinokurov et al. | |
| 2010/0010887 A1 | 1/2010 | Karlin et al. | |
| 2010/0138884 A1 | 6/2010 | Lau | |
| 2010/0145796 A1 | 6/2010 | Berry et al. | |
| 2010/0166389 A1 | 7/2010 | Knee et al. | |
| 2010/0205628 A1 | 8/2010 | Davis et al. | |
| 2011/0171982 A1 | 7/2011 | Wang et al. | |

OTHER PUBLICATIONS

Office Action dated Aug. 4, 2010, U.S. Appl. No. 11/850,029, filed Sep. 4, 2007, 11 pages.

Lee, Wing K., "Contextual Multimedia Metatagging", U.S. Appl. No. 11/617,707, filed Dec. 28, 2006.

Zhu, Kevin, "Multimedia Product Placement Marketplace," U.S. Appl. No. 12/606,276, filed Oct. 27, 2009.

Lee, Wing K., "System and Method for Identifying and Managing Social Circles," filed Dec. 28, 2006 U.S. Appl. No. 11/617,709.

Izdepski, Erich, et al., "Multimedia Broadcast Discovery and Delivery," filed Sep. 26, 2006, U.S. Appl. No. 11/527,929.

Delker, Jason R., et al.., "Video Content Tagging System and Method," filed Oct. 13, 2006, U.S. Appl. No. 11/580,719.

Gailloux, et al.., "Enabling Communication Between End Points of Different Networks," filed Aug. 23, 2006, U.S. Appl. No. 11/466,558.

Gailloux, et al.., "Personalized Television," filed Aug. 26, 2006, U.S. Appl. No. 11/466,643.

Federal Communications Commission, 47 C.F.R. 73.682(a), Oct. 1, 2003.

Advanced Television Systems Committee, "ATSC Recommended Practice: Program and System Information Protocol Implementation Guidelines for Broadcasters", Doc. A/69, Jun. 25, 2002.

M. Nilsson, "ID3 Tag Version 2.4.0—Native Frames", Nov. 1, 2000, http://www.id3.org/id3v2.4.0-frames.txt.

M. Nilsson, "ID3 Tag Version 2.4.0—Main Structure", Nov. 1, 2000, http://www.id3.org/id3v2.4.0-structure.txt.

Office Action dated Feb. 25, 2009, U.S. Appl. No. 11/617,707, filed Dec. 28, 2006, 14 pages.

Final Office Action dated Aug. 19, 2009, U.S. Appl. No. 11/617,707, filed Dec. 28, 2006, 17 pages.

Office Action dated Nov. 10, 2009, U.S. Appl. No. 11/617,707, filed Dec. 28, 2006, 21 pages.

Final Office Action dated May 26, 2010, U.S. Appl. No. 11/617,707, filed Dec. 28, 2006, 21 pages.

Office Action dated Feb. 20, 2009, U.S. Appl. No. 11/466,643.

Final Office Action dated Sep. 1, 2009, U.S. Appl. No. 11/466,643.

Advisory Action dated Dec. 1, 2009, U.S. Appl. No. 11/466,643.

Office Action dated Feb. 2, 2010, U.S. Appl. No. 11/466,643, 31 pages.

Office Action dated Dec. 29, 2008, U.S. Appl. No. 11/580,719, 29 pages.

Office Action dated Jul. 7, 2009, U.S. Appl. No. 11/580,719, 25 pages.

Notice of Abandonment dated Feb. 1, 2010, U.S. Appl. No. 11/580,719, 2 pages.

(56) References Cited

OTHER PUBLICATIONS

Office Action dated Apr. 29, 2009, U.S. Appl. No. 11/466,558, 14 pages.
Final Office Action dated Nov. 3, 2009, U.S. Appl. No. 11/466,558, 19 pages.
Office Action dated Mar. 5, 2010, U.S. Appl. No. 11/466,558, 21 pages.
Office Action to Restriction dated Jan. 11, 2011, U.S. Appl. No. 11/850,029, filed Sep. 4, 2007.
Office Action dated Oct. 7, 2010, U.S. Appl. No. 11/617,707, filed Dec. 28, 2006.
FAIPP Office Action dated May 14, 2013, U.S. Appl. No. 13/267,550, filed Oct. 6, 2011.
Notice of Allowance dated Aug. 2, 2013, U.S. Appl. No. 13/267,550, filed Oct. 6, 2011.
Final Office Action dated Sep. 7, 2012, U.S. Appl. No. 12/606,276, filed Oct. 27, 2009.
Advisory Action dated Oct. 31, 2012, U.S. Appl. No. 12/606,276, filed Oct. 27, 2009.
Delker, Jason R., "Method for Providing Personalized, Targeted Advertisements During Playback of Media," U.S. Appl. No. 13/267,550, filed Oct. 6, 2011.
Corrected Notice of Allowability dated Aug. 5, 2011, U.S. Appl. No. 11/617,707, filed Dec. 28, 2006.
Notice of Allowance dated Aug. 5, 2011, U.S. Appl. No. 11/850,029, filed Sep. 4, 2007.
Office Action dated Sep. 19, 2011, U.S. Appl. No. 12/110,277, filed Apr. 25, 2008.
Advisory Action dated Jul. 22, 2011, U.S. Appl. No. 12/243,735, filed Oct. 1, 2008.
Office Action dated Aug. 15, 2011, U.S. Appl. No. 12/243,735, filed Oct. 1, 2008.
Final Office Action dated Dec. 6, 2011, U.S. Appl. No. 12/243,735, filed Oct. 1, 2008.
Delker, Jason R., "Method for Providing Personalized, Targeted Advertisements During Playback of Media," U.S. Appl. No. 14/077,207, filed Nov. 11, 2013.
Office Action dated Aug. 2, 2012, U.S. Appl. No. 11/466,558.
Notice of Allowance dated Feb. 5, 2013, U.S. Appl. No. 11/466,558.
Office Action—Restriction Requirement dated Mar. 8, 2012, U.S. Appl. No. 12/606,276, filed Oct. 27, 2009.
Advisory Action dated Feb. 14, 2012, U.S. Appl. No. 12/243,735, filed Oct. 1, 2008.
Final Office Action dated Apr. 3, 2012, U.S. Appl. No. 12/110,277, filed Apr. 25, 2008.
Delker, Jason R., et al., "Method and System for Selecting Advertisements to Display on a Television," U.S. Appl. No. 12/110,277, filed Apr. 25, 2008.
Delker, Jason R., et al., "Media Insertion Points," U.S. Appl. No. 12/243,735, filed Oct. 1, 2008.
Office Action dated Sep. 28, 2010, U.S. Appl. No. 12/110,277, filed Apr. 25, 2008.
Office Action dated Dec. 27, 2010, U.S. Appl. No. 12/243,735, filed Oct. 1, 2008.
FAIPP Pre-Interview Communication dated May 14, 2012, U.S. Appl. No. 12/606,276, filed Oct. 27, 2009.
Final Office Action dated Apr. 13, 2011, U.S. Appl. No. 11/617,707, filed Dec. 28, 2006.
Notice of Allowance dated Jun. 10, 2011, U.S. Appl. No. 11/617,707, filed Dec. 28, 2006.
Final Office Action dated Apr. 28, 2011, U.S. Appl. No. 11/850,029, filed Sep. 4, 2007.
Final Office Action dated Apr. 13, 2011, U.S. Appl. No. 12/110,277, filed Apr. 25, 2008.
Advisory Action dated Jun. 8, 2011, U.S. Appl. No. 12/110,277, filed Apr. 25, 2008.
Final Office Action dated May 16, 2011, U.S. Appl. No. 12/243,735, filed Oct. 1, 2008.
Advisory Action dated Jun. 15, 2012, U.S. Appl. No. 12/110,277, filed Apr. 25, 2008.
First Action Interview Office Action dated Jul. 18, 2012, U.S. Appl. No. 12/606,276, filed Oct. 27, 2009.
Restriction Requirement dated Jan. 18, 2013, U.S. Appl. No. 13/267,550, filed Oct. 6, 2011.
Pre-Interview Communication dated Mar. 14, 2013, U.S. Appl. No. 13/267,550, filed Oct. 6, 2011.
Office Action dated May 24, 2011, U.S. Appl. No. 11/466,643.
Notice of Allowance dated Feb. 16, 2012, U.S. Appl. No. 11/466,643.
Final Office Action dated Aug. 26, 2011, U.S. Appl. No. 11/466,558, 21 pages.
Office Action dated May 5, 2014, U.S. Appl. No. 12/606,276, filed Oct. 27, 2009.

* cited by examiner

DUAL CHANNEL PRESENCE DETECTION AND CONTENT DELIVERY SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Broadcast TV programs are often interrupted by program related content, other programming announcements, or commercial advertisements. Regular interruptions of TV programs by such content could make the customer's viewing experience less enjoyable. Frequent interruptions to a program broadcast in real-time, such as a sporting event, may even cause the customer to miss important events during the game. If the customer is not interested in watching the content during the program breaks, the customer may tune out and eventually lose all interest in watching the program.

SUMMARY

In an embodiment, a dual channel communication system for detecting customer presence is disclosed. The system comprises a fixed component configured to receive a media content over a first channel, at least one mobile component configured to receive a targeted content based on a media related to the media content over a second channel, and a service provider that sends the media content and the targeted content. The fixed component detects the mobile component presence within proximity range using a short range wireless connection.

In another embodiment, a method for detecting a customer device presence and dual channel content delivery is disclosed. The method comprises delivering a program content over a first channel to a primary device, playing the program content using the primary device, detecting a customer device presence within proximity of the primary device, delivering a targeted ad based on a program related to the program content over a second channel to a customer mobile device, and playing the targeted ad using the customer mobile device.

In yet another embodiment, a dual channel communication network is disclosed. The network comprises a first and a second short range wireless technology enabled device. The first short range wireless technology enabled device is configured to receive media. The second short range wireless technology enabled device is configured to receive targeted content based on media when the second short range wireless technology device is detected within proximity of the first short range wireless technology enabled device using a short range wireless technology.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The customer may be more receptive to targeted content based on programming, content related to programming, or other announcements of interest to the customer when the targeted content is delivered at the customer's convenience and does not interfere with the primary programming. Disclosed herein is a dual channel system that may deliver a program as well as some targeted content downstream to a customer. The dual channel system is based on combining or fusing a primary channel that may be a cable or media service channel with a secondary channel that may be a phone or telecom service channel to deliver the program and the targeted content. The program may be delivered over the primary channel using a primary device without interruptions by the targeted content, wherein the targeted content may be delivered over the separate secondary channel using a customer's mobile device. The system may deliver the targeted content using the customer's mobile device after identifying the customer's presence within proximity of the primary device. The system may identify the customer's presence within proximity of the primary device by detecting the customer's mobile device and establishing a short range wireless link between the customer's mobile device and the primary device. The system may deliver some targeted content related to the program that may be of interest to the customer using the customer's mobile device. The targeted content may be delivered from the primary device to the customer's mobile device via the secondary channel established over the short range wireless link. The targeted content may also be delivered from the cable or media service provider to the customer's mobile device via a secondary channel established over a long range wireless link. Alternatively, the targeted content may be forwarded from the media service provider to the customer's mobile device over a wireless network by a mobile service provider in communication with the media service provider and the customer's mobile device. The customer may use the mobile device to view the targeted content or to communicate upstream even when away from the primary device.

Figure 1:
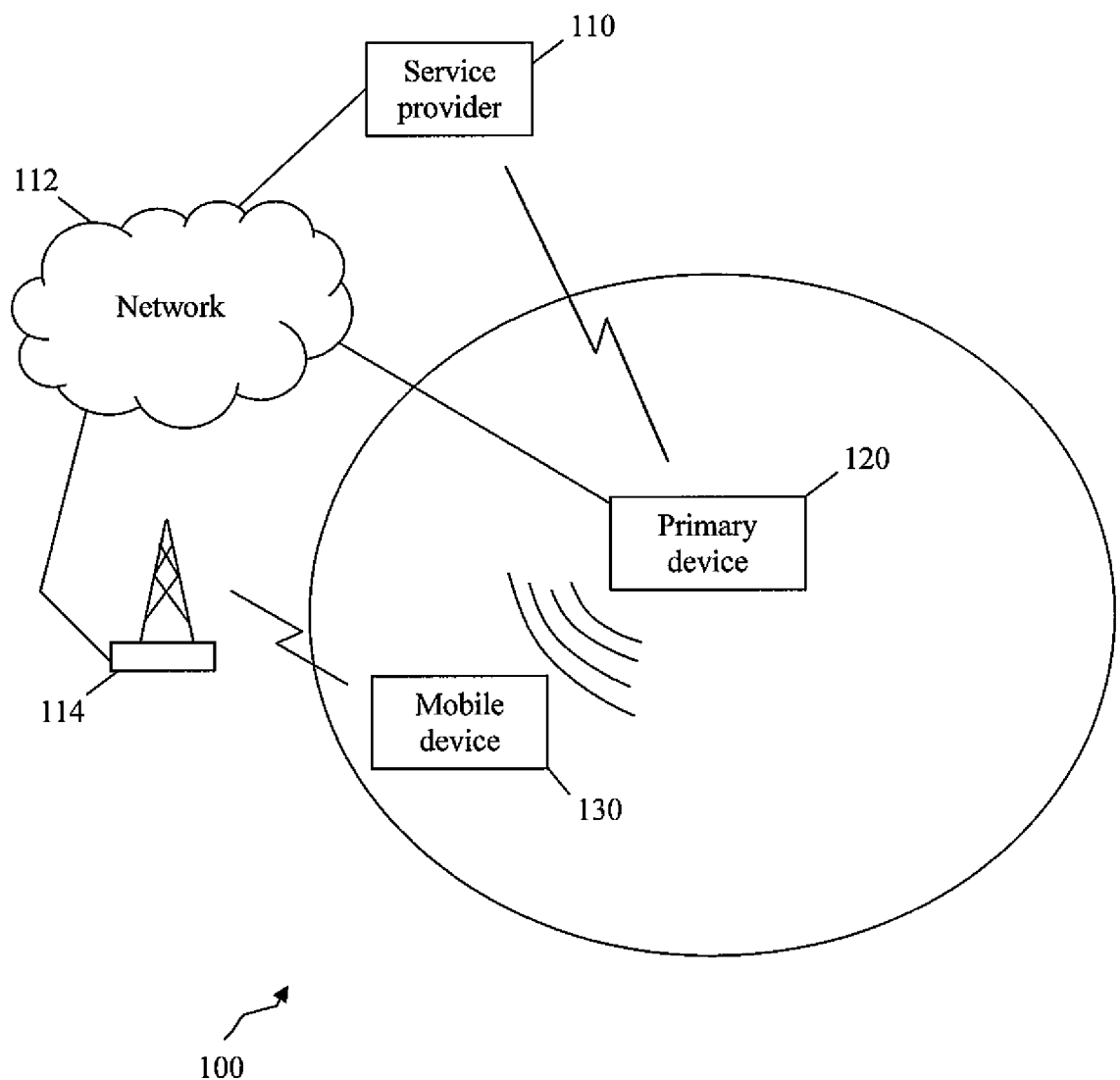
FIG. 1 is a block diagram of a system according to an embodiment of the disclosure.

FIG. 1 illustrates an embodiment of a system 100 for dual channel communication and customer presence detection. The system 100 may comprise a service provider 110, a primary device 120, and a mobile device 130. The primary device 120 may be connected to the service provider 110 either via a fixed link or wirelessly. The primary device 120 may be connected to the service provider 110 indirectly through some telecommunication or other network 112. The mobile device 130 may communicate with the primary device 120 through a short range wireless link 114. The mobile device 130 may also communicate, directly or indirectly, with the service provider 110 through another wireless link 114.

The service provider 110 may be any device, component, or source that may transport media content downstream to the primary device 120. In an embodiment, the service provider 110 may comprise a broadcast transmitter. Media content may include television programs, streaming video content, streaming audio content, gaming content, still photos, or a combination of these as well as other media content. In an embodiment, the service provider 110 may be a television cable network, a television broadcast network, or a television satellite network. In other embodiments, the service provider 110 may be a video distribution center for cable broadcast in a video over DSL network, wherein media content may include streamed video over DSL (VOD).

The primary device 120 may be a fixed user-oriented device that may receive and display media content from the service provider 110. For instance, the primary device 120 may be a set-top box, a desktop computer, or a television. The primary device 120 may receive the media content from the service provider 110 via a fixed link, such as coaxial cable or optical fiber. The primary device 120 may receive the media content from the service provider 110 via a long range wireless link, such as a satellite link or a Worldwide Interoperability for Microwave Access (WiMAX) link. The service provider 110 may also transmit the media content over a broadcast TV link to the primary device 120. In an embodiment the primary device 120 may replace the service provider 110, wherein the primary device 120 may comprise a media server that may have access to some media database.

The mobile device 130 may be any mobile device that may communicate with the primary device 120. Specifically, the mobile device 130 may be a mobile user-oriented device that communicates with the primary device 120 via a short range wireless link. The wireless link may be a Bluetooth link, a WiFi link, a near field communication (NFC) link, an Infrared Data Association (IrDa) link, a radio frequency identification (RFID), or other link. For example, the mobile device 130 may be a cellular phone, a personal digital assistant (PDA), a notebook computer, or any other wireless devices.

In one embodiment of the system 100, the service provider 110 may send media content downstream over a primary channel to the primary device 120. The primary device 120 may receive the downstream media content over the primary channel and play the media content from the service provider 110. For example, a set top box may receive a real-time football game downstream and play the game on a connected display screen. Furthermore, the mobile device 130 may be within proximity range from the primary device 120 as shown in the FIG. 1. When the mobile device 130 is close enough to the primary device 120, the primary device 120 may establish, for instance, a peer-to-peer connection over a short range wireless link. The primary device 120 and the mobile device 130 may hence establish a connection over a secondary channel via the short range wireless link. For example, a set top box enabled with Bluetooth technology in a room may detect the presence of a cell phone in the same room, where the cell phone is similarly enabled with Bluetooth technology and within standard Bluetooth connection range.

Once the primary device 120 detects and establishes a secondary channel for communicating with the mobile device 130, the primary device 120 may send, downstream via the secondary channel, some targeted content, such as a targeted ad or announcement, related to the displayed media content over the primary channel. The primary device 120 may send related media content such as an announcement message, which may include targeted advertisements that may be of interest to a customer viewing the media content. Specifically, targeted advertisements directed at brand names embedded in the media content may be assumed to be of interest to the customer. For example, while playing a movie, a set top box equipped with Bluetooth technology may detect the presence of a customer's cell phone in the same room using Bluetooth technology. The set top box may then send a text message to the cell phone, over a Bluetooth link. The text message may include purchasing information for music related to the movie, or soundtrack, and other purchasing information associated with products placed in the movie. The primary device 120 may also send targeted content associated with embedded metatags, closed captioning, or subtitle keywords in the media content. An embedded metatag may comprise a URL address for a website which includes information about some commercial product, brand name, or program related content.

In another embodiment, the service provider 110 may send the targeted content to the mobile device 130 using the wireless link 114 after detecting the presence of the mobile device 130 in proximity of the primary device 120. For instance, the primary device 120 may detect the presence of the mobile device 130 in the same room using a short range wireless technology. The primary device 120 may hence notify the service provider 110 of the detected presence of the mobile device 130. In turn, the service provider 110 may deliver the targeted content directly to the mobile device 130 over the second channel via the wireless link 114. Alternatively, the service provider 110 may send the targeted content, using the wireless link 114 or another long range wireless link, to a mobile service provider which may then forward the targeted content to the mobile device 130. For instance, the service provider may send the targeted content over a cellular link to a cellular network service provider, which may forward the targeted content to the mobile device 130 over the network.

After receiving the media related content from the primary device 120, the mobile device 130 may be used to play the media related content. For example, a cell phone may be used to receive a message comprising a hyperlink with content related to an episode of a television series that is being played on a set top box in the room. The hyperlink on the cell phone may be used to access and play a previous episode of the television series. The hyperlink on the cell phone may be used to play the previous episode by establishing a direct connection with the service provider 110 via a long range wireless link, or an indirect connection to some media server. Hence, the hyperlink on the cell phone may be used to play the previous episode in the same room or away from the set top box and beyond the reach of a short range wireless link. For example, a cell phone may be dialed to place a vote after receiving a message from a set top box urging to vote for a game show. The cell phone may be dialed after leaving the room of the set top box, and a vote may be placed by connecting to the service provider 110 over a cellular network. In another embodiment, the mobile device 130 may communicate upstream with the primary device 120 over the secondary channel via a short range wireless link, such as a WiFi link.

Although one mobile device 130 is shown in FIG. 1, it should be understood that a plurality of mobile devices 130 may be present within proximity of the primary device 120. When a plurality of mobile devices 130 are present within proximity of a short range wireless link, the primary device 120 may detect each mobile device 130 and establish communication over separate secondary channels with each mobile device 130. The primary device 120 may then send to each mobile device 130 some targeted content as described above. The same targeted content may be sent generally to at least some of the mobile devices 130. Instead, the forwarded targeted content may be selected distinctly based on a specific profile or user interest associated with each mobile device 130.

Figure 2:
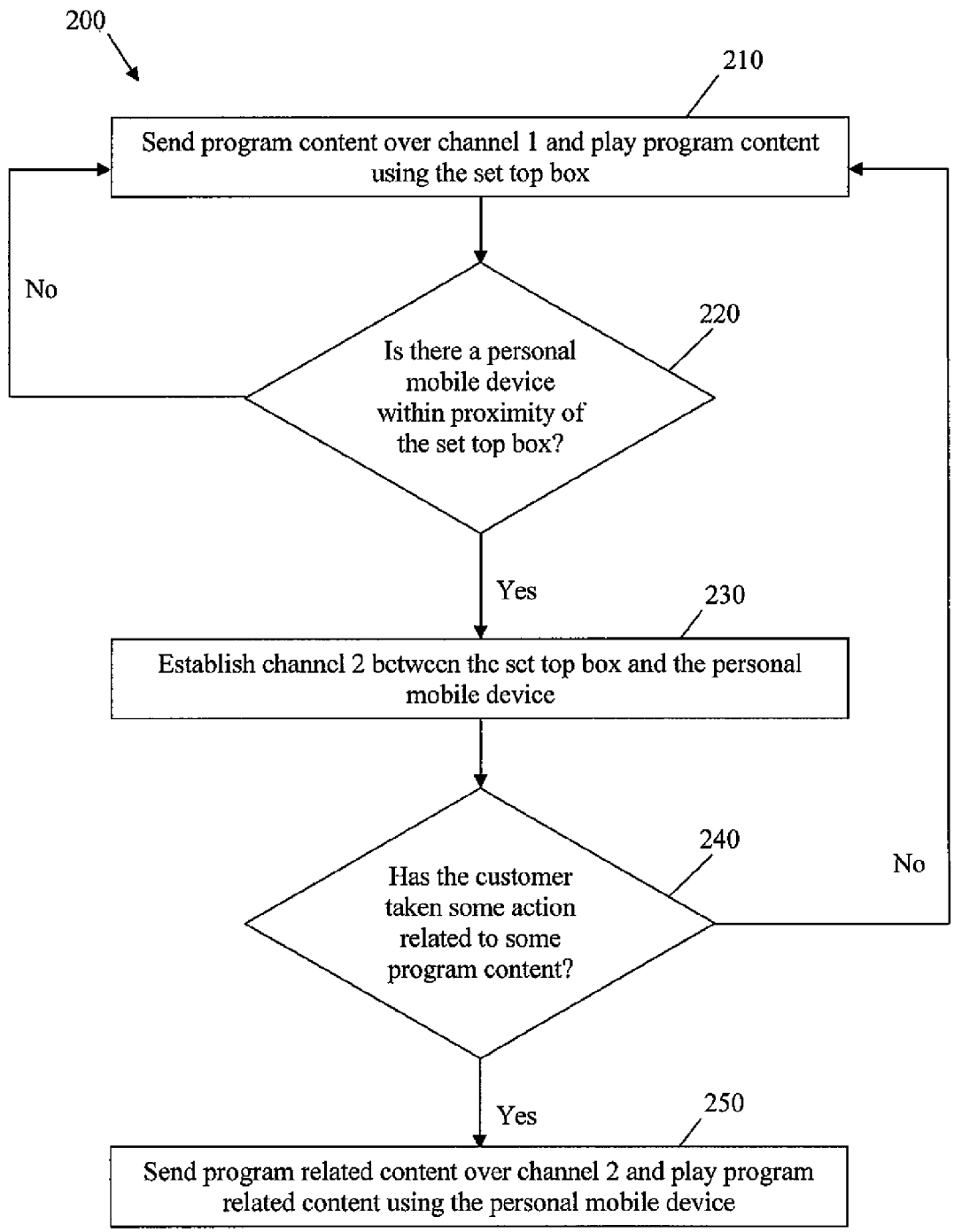
FIG. 2 is a flow chart illustrating a method according to an embodiment of the disclosure.

FIG. 2 illustrates a flowchart of a method 200 that may be implemented for dual channel communication and customer presence detection. At block 210, media content may be downloaded from the service provider 110, for example from a media server, media center or media content database to the primary device 120, for example to a set top box. The media content may be downloaded by establishing a wireless link between the media server and the set top box and transporting the media content downstream over a communication channel. The media content may be played on a display screen connected to the set top box. For example, a program may be selected by a customer using the set top box that is connected to a television screen. The selected program may then be downloaded over the communication channel from the service provider 110, which may be a cable service provider, to the set top box and displayed on the screen in real-time. In an embodiment, a VOD may be streamed over a DSL network from a video distributor center for cable broadcast. The streamed VOD may be downloaded to a desktop computer that is connected to the DSL network. The streamed VOD may be viewed in real-time on the desktop computer, or may be replayed at a later time. In yet another embodiment, the program may be previously downloaded to the set top box or to a hard drive, or any other storage device, connected to the set top box. The program on the hard drive may be replayed on the screen connected to the set top box.

At block 220, the method 200 may monitor presence of the mobile device 130 within proximity of the set top box, or alternatively within proximity of the desktop computer. The mobile device 130 may be any customer personal communication device that is portable. The method 200 may monitor the presence of the mobile device 130 within proximity using a short range wireless technology, such as WiFi or Bluetooth. The short range wireless technology may enable the set top box, or the desktop computer, to establish communication with the mobile device 130 within proximity, for instance in the same room. Specifically, the method 200 may detect the mobile device 130 using the short range wireless technology to identify the customer's presence in the same room with the set top box. The customer's presence within such proximity may signify the customer interest or attendance to view the program in play. On the other hand, when no personal mobile device 130 is detected in the room, it may be assumed that no customer is present due to lack of interest in the program or due to other engagements. The method 200 may continue program streaming while searching for a single or a plurality of potential mobile devices 130 that may be approaching the set top box.

At block 230, when the mobile device 130 is detected within proximity of the set top box, a second communication channel may be established. The second communication channel may be established between the set top box and the mobile device 130 using the short range wireless technology. Unlike the first communication channel that may be used primarily as a media content downstream channel, the second channel may be used for providing or down-streaming related media content to the mobile device 130, as well as for receiving or up-streaming any customer feedback from the mobile device 130 to the set top box directly or to a media server that may be connected to the set top box. The media server may also be located at some remote service provider location. Customer feedback may comprise a program request message, selection of a link to content, voting on some aspect of the program, or any communication from the customer that may be related to any displayed program content. The method 200 may establish a plurality of separate communication channels with a plurality of mobile devices 130 that may be detected within proximity.

At block 240, the method 200 may detect customer actions related to some content of the displayed program. In some embodiments, the method 200 may additionally detect the customer pattern of actions related to the displayed programming. The customer action may be any action taken by the customer while the program is being displayed using the set top box controls or other devices that may be connected to the set top box. For example, the customer action may comprise turning a particular program on, switching to a particular channel, pausing or replaying a program using a TIVO or some other digital video recorder (DVR) system. Monitoring such customer actions, or the customer's pattern of actions, taken while viewing some program content may provide a means for sending targeted content related to programming. The customer's actions may inform a service provider 110, or other marketing or commercial providers associated with the targeted content, of the customer's personal interests. Hence, improved targeted content, such as commercial advertisements or program related announcements may be provided to the customer. The improved targeted content may be more effective in getting the customer's attention, exciting the customer's curiosity, or getting some customer feedback.

At block 250, when the method 200 detects a customer action related to some programming, the method 200 may send targeted content to the customer. The targeted content may be sent from the set top box to the customer's mobile device 130 in the room over the second communication channel. The targeted content may be associated with some particular program content playing at the moment a customer action is detected. The targeted content may be sent in a form of a text message, for instance in the form of a short message service (SMS). The message may comprise URL addresses or hyperlinks to media content related to the program, such as movie clips or music clips. The URL addresses or hyperlinks may include information related to the program such as program scheduling, voting, or program ratings. The targeted content may also comprise information for purchasing additional media content or commercial products for brand names appearing within the program or for program sponsors.

While the mobile device 130 is detected within proximity, the method 200 may send a plurality of messages with targeted content related to a single or a plurality of programs that are being played. The plurality of messages may be stored in a memory of the mobile device 130 until the program related content may be accessed at a later time. The targeted content may be accessed using the hyperlinks or the URL addresses in the messages that are stored in the memory of the mobile device 130. In one embodiment, the method 200 may access the targeted content using the customer's mobile device 130 within proximity of the set top box. The mobile device 130 may access the targeted content while the program is being played or at any future time. The mobile device 130 may access the targeted content by sending an upstream request to the set top box within range, wherein the related content may be downloaded to the mobile device 130. The request may be sent from the mobile device 130 to the set top box over the second channel via the established short range wireless link. The second channel may thus be utilized for downstream and upstream communication between the customer and the media server. In another embodiment, the method 200 may access the targeted content using the customer's mobile device 130 away from the set top box and out of range of the short range wireless link. The method 200 may access the targeted content by establishing a long range wireless link, such as a WiFi or a cellular link, between the mobile device 130 and the service provider 110. The targeted content may then be downloaded from the service provider 110 to the mobile device 130 via the established long range wireless link.

As described above, the method 200 may begin monitoring customer actions related to some played program after detecting the presence of the mobile device 130 within proximity and establishing a second communication channel between the set top box and the mobile device 130. However, other embodiments of the method 200 may be implemented. In one case, the method 200 may first monitor customer actions related to some played program before detecting the presence of the mobile device 130 within proximity and establishing a second communication channel between the set top box and the mobile device 130. In another case, the method 200 may detect the presence of the mobile device 130 within proximity and establish a second communication channel between the set top box and the mobile device 130. The method 200 may then send targeted content to the mobile device 130 without monitoring customer actions related to the played program. Instead, a customer action may be recognized as merely playing a down-streamed program. Targeted content related to the program may thus be selected based on embedded metatags, closed captioning, or subtitle keywords.

Figure 3:
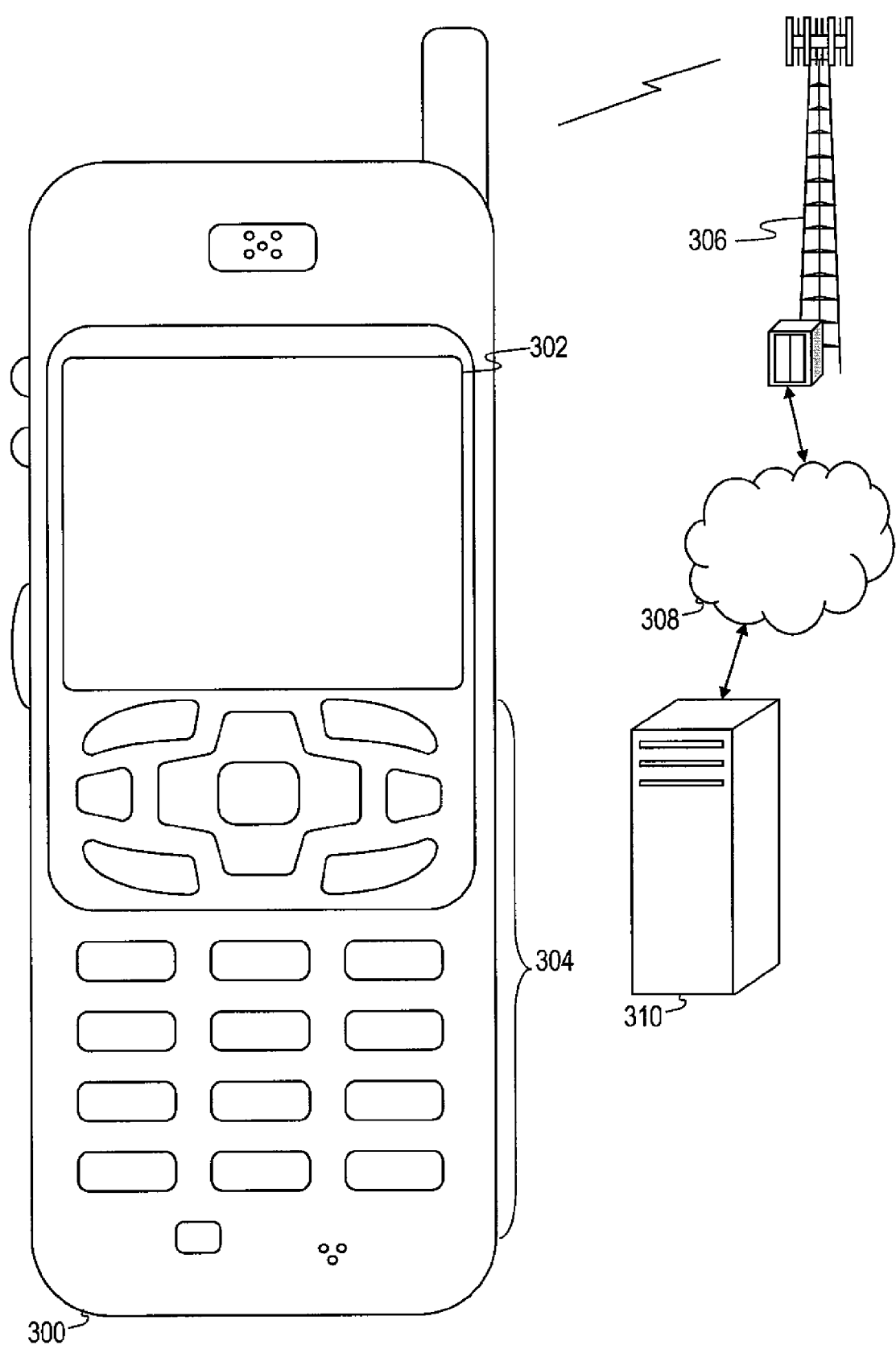
FIG. 3 is an illustration of a mobile device according to an embodiment of the disclosure.

Turning now to FIG. 3 a handset 300 is shown which is operable for implementing aspects of the present disclosure, but the present disclosure should not be limited to these implementations. For example, in an embodiment the handset 300 may be used to implement the mobile device 130. Though illustrated as a mobile phone, the handset 300 may take various forms including a wireless handset, a pager, a personal digital assistant (PDA), a portable computer, a tablet computer, or a laptop computer. Many suitable handsets combine some or all of these functions. In some embodiments of the present disclosure, the handset 300 is not a general purpose computing device like a portable, laptop or tablet computer, but rather is a special-purpose communications device such as a mobile phone, wireless handset, pager, or PDA. The handset 300 may support specialized work assignments such as inventory control, job control, and/or task management functions.

The handset 300 includes a display 302 and a touch-sensitive surface or keys 304 for input by a user. The handset 300 may present options for the user to select, controls for the user to actuate, and/or cursors or other indicators for the user to direct. The handset 300 may further accept data entry from the user, including numbers to dial or various parameter values for configuring the operation of the handset. The handset 300 may further execute one or more software or firmware applications in response to user commands. These applications may configure the handset 300 to perform various customized functions in response to user interaction. Additionally, the handset 300 may be programmed and/or configured over-the-air, for example from a wireless base station, a wireless access point, or a peer handset 300.

The handset 300 may execute a web browser application which enables the display 302 to show a web page. The web page may be obtained via wireless communications with a cell tower 306, a wireless network access node, a peer handset 300 or any other wireless communication network or system. The cell tower 306 (or wireless network access node) is coupled to a wired network 308, such as the Internet. Via the wireless link and the wired network, the handset 300 has access to information on various servers, such as a server 310. The server 310 may provide content that may be shown on the display 302. Alternately, the handset 300 may access the cell tower 306 through a peer handset 300 acting as an intermediary, in a relay type or hop type of connection.

The handset 300 may provide support for receiving and sending email, SMS message, and text messages, and receiving video clips, for example to provide notification of package delivery or advance notice to promote timely rendezvous of the recipient with delivery service personnel to complete delivery of the package. The handset 300 may provide support for rendezvous negotiation.

Figure 4:
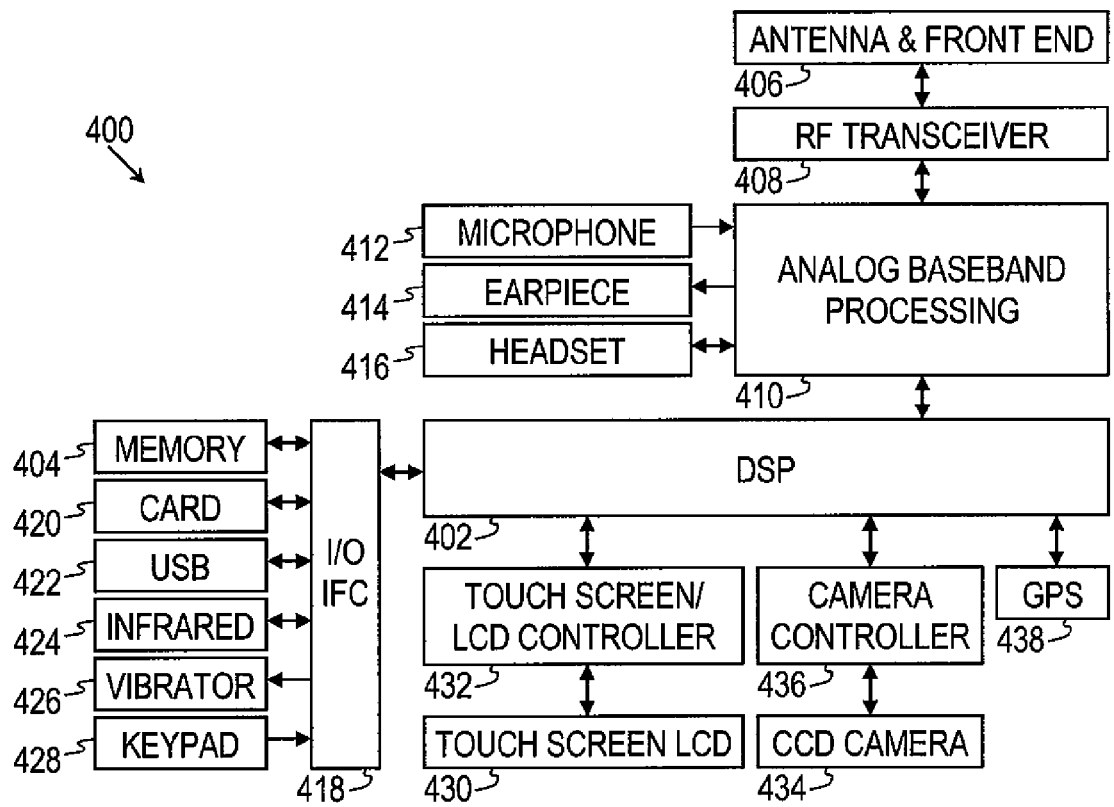
FIG. 4 is a block diagram of a mobile device according to an embodiment of the disclosure.

FIG. 4 shows a block diagram of the handset 400. While a variety of known components of handsets 400 are depicted, in an embodiment a subset of the listed components and/or additional components not listed may be included in the handset 400. The handset 400 includes a digital signal processor (DSP) 402 and a memory 404. As shown, the handset 400 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the handset 400 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the handset 400 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the handset 400 to send and receive information from a cellular network or some other available wireless communications network or from a peer handset 400. In an embodiment, the antenna and front end unit 406 may include multiple antennas whereby to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity the description here separates the description of this signal processing from the RF and/or radio stage and conceptually allocates that signal processing to the analog baseband processing unit 410 and/or the DSP 402 or other central processing unit. In some embodiments the RF transceiver 408, portions of the antenna and front end 406, the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset 416 and outputs to the earpiece 414 and the headset 416. To that end, the analog baseband processing unit 410 may have ports for connecting to the built-in microphone 412 and the earpiece speaker 414 that enable the handset 400 to be used as a cell phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast fourier transforming, and cyclic prefix appending and for a receiver function the DSP 402 may perform cyclic prefix removal, fast fourier transforming, deinterleaving, decoding, and demodulation. In other wireless technology applications yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB interface 422 and the infrared port 424. The USB interface 422 may enable the handset 400 to function as a peripheral device to exchange information with a personal computer or other computer system. The infrared port 424 and other optional ports such as a Bluetooth interface or an IEEE 802.11 compliant wireless interface may enable the handset 400 to communicate wirelessly with other nearby handsets and/or wireless base stations.

The input/output interface 418 may further connect the DSP 402 to the vibrator 426 that, when triggered, causes the handset 400 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the handset 400. Another input mechanism may be the touch screen LCD 430, which may also display text and/or graphics to the user. The touch screen LCD controller 432 couples the DSP 402 to the touch screen LCD 430.

The CCD camera 434 enables the handset 400 to take digital pictures. The DSP 402 communicates with the CCD camera 434 via the camera controller 436. The GPS sensor 438 is coupled to the DSP 402 to decode global positioning system signals, thereby enabling the handset 400 to determine its position. In another embodiment, a camera operating according to a technology different from Charge Coupled Device cameras may be employed. Various other peripherals may also be included to provide additional functions, e.g., radio and television reception.

Figure 5:
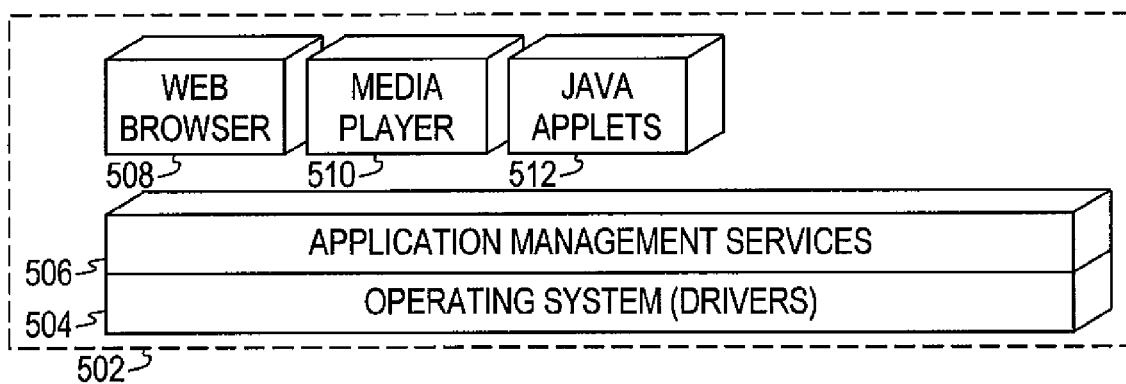
FIG. 5 is a block diagram of a software configuration for a mobile device according to an embodiment of the disclosure.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the handset 400. Also shown in FIG. 5 are a web browser application 508, a media player application 510, and JAVA applets 512. The web browser application 508 configures the handset 400 to operate as a web browser, allowing a user to enter information into forms and select links to retrieve and view web pages. The media player application 510 configures the handset 400 to retrieve and play audio or audiovisual media. The JAVA applets 512 configure the handset 400 to provide games, utilities, and other functionality.

Figure 6:
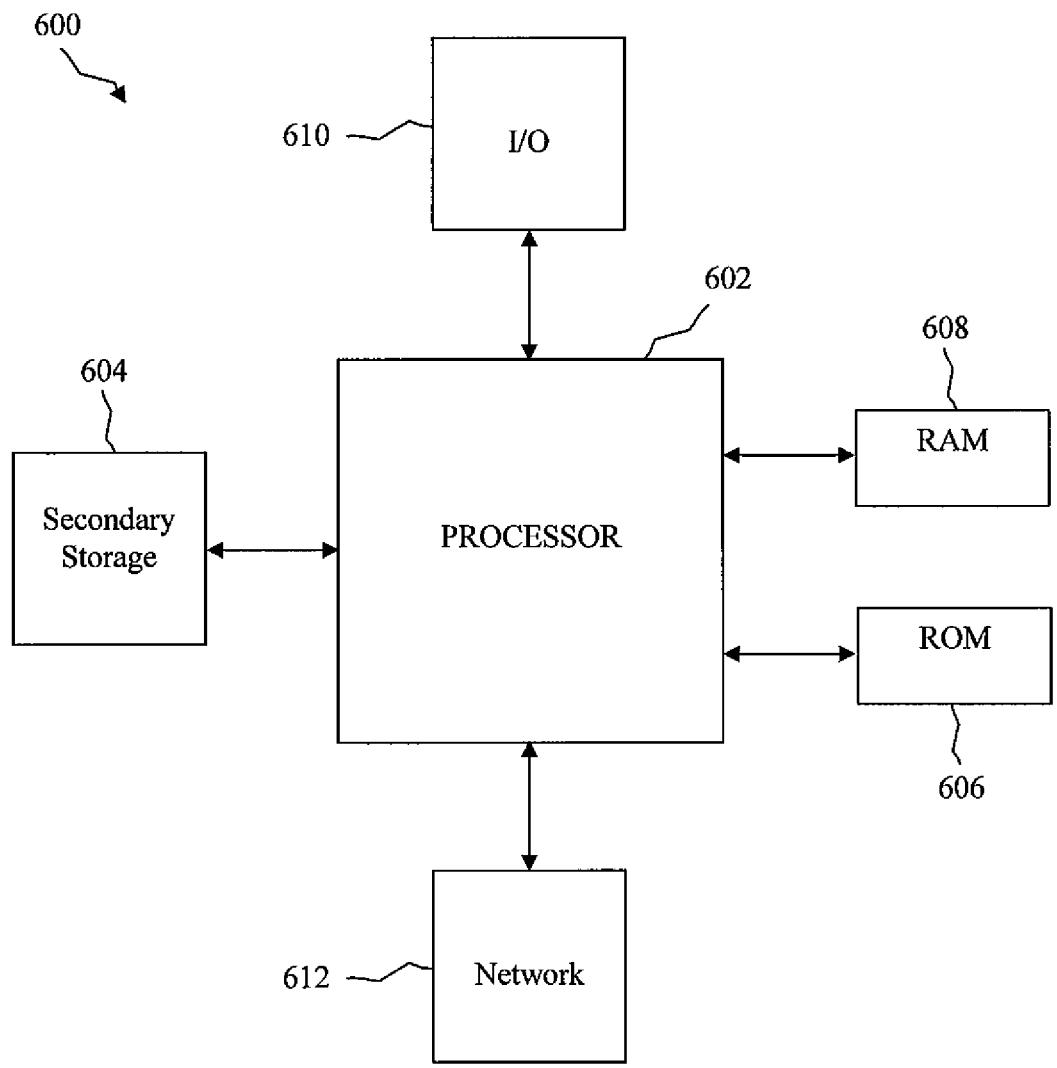
FIG. 6 illustrates an exemplary general purpose computer system suitable for implementing the several embodiments of the disclosure.

Portions of the system 100 described above, for example the primary device 120 and/or the service provider 110, may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor may be implemented as one or more CPU chips.

The secondary storage 604 is typically comprised of one or more disk drives or tape drives and is used for non-volatile storage of data and as an over-flow data storage device if RAM 608 is not large enough to hold all working data. Secondary storage 604 may be used to store programs which are loaded into RAM 608 when such programs are selected for execution. The ROM 606 is used to store instructions and perhaps data which are read during program execution. ROM 606 is a non-volatile memory device which typically has a small memory capacity relative to the larger memory capacity of secondary storage. The RAM 608 is used to store volatile data and perhaps to store instructions. Access to both ROM 606 and RAM 608 is typically faster than to secondary storage 604.

I/O devices 610 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 612 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 612 may enable the processor 602 to communicate with an Internet or one or more intranets. With such a network connection, it is contemplated that the processor 602 might receive information from the network, or might output information to the network in the course of performing the above-described method steps. Such information, which is often represented as a sequence of instructions to be executed using processor 602, may be received from and outputted to the network, for example, in the form of a computer data signal embodied in a carrier wave.

Such information, which may include data or instructions to be executed using processor 602 for example, may be received from and outputted to the network, for example, in the form of a computer data baseband signal or signal embodied in a carrier wave. The baseband signal or signal embodied in the carrier wave generated by the network connectivity devices 612 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 602 executes instructions, codes, computer programs, scripts which it accesses from hard disk, floppy disk, optical disk (these various disk based systems may all be considered secondary storage 604), ROM 606, RAM 608, or the network connectivity devices 612. While only one processor 602 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A dual channel communication system for detecting customer presence comprising:
   a fixed component configured to receive a media content over a primary channel, the fixed component further configured to detect a first mobile component presence within a proximity range of itself using a short range wireless connection and to detect a second mobile component presence within the proximity range using a short range wireless connection; and
   a service provider configured to provide the media content to the fixed component over the primary channel, the service provider further configured to promote providing a first targeted content related to the media content to the first mobile component over a first secondary channel while the first mobile component is within the proximity range of the fixed component and to promote providing a second targeted content related to the media content and different from the first targeted content to the second mobile component over a second secondary channel while the second mobile component is within the proximity range of the fixed component, wherein at least one of the first targeted content and the second targeted content is a message comprising advertisements targeting a customer's interest that is transmitted by the fixed component to at least one of the first mobile component and the second mobile component.

2. The system of claim 1, wherein detecting one of the first and second the mobile components presence within proximity range of the fixed component indicates the customer interest in the received media content over the first channel.

3. The system of claim 1, wherein at least one of the first targeted content and the second targeted content is a hyperlink to information about a commercial product related to the media content received by the fixed component over the first channel, and is transmitted by the fixed component to at least one of the first mobile component and the second mobile component.

4. The system of claim 1, wherein at least one of the first targeted content and the second targeted content is associated with a metatag embedded in the media content received by the fixed component over the first channel.

5. The system of claim 1, wherein the fixed component receives the media content from the service provider over the first channel using a long range fixed connection.

6. The system of claim 1, wherein the service provider transmits at least one of the first targeted content and the second targeted content to the fixed component and the fixed component transmits the at least one of the first targeted content and the second targeted content to one of the first mobile component and the second mobile component over one of the first secondary channel and the second secondary channel using a short range wireless connection.

7. The system of claim 1, wherein the service provider transmits at least one of the first targeted content and the second targeted content to at least one of the first mobile component and the second mobile component using a long range wireless connection.

8. A method for detecting a customer device presence and dual channel content delivery, comprising:

delivering a program content over a first channel to a primary device;

playing the program content using the primary device;

detecting a first customer mobile device presence within proximity of the primary device;

detecting a second customer device presence within the proximity of the primary device delivering a first targeted ad related to the program content over a first secondary channel to the first customer mobile device while the first customer mobile device is within the proximity of the primary device; and delivering a second targeted ad related to the program content and different from the first targeted ad over a second secondary channel to the second customer mobile device while the second customer mobile device is within the proximity of the primary device, wherein at least one of the first targeted ad and the second targeted ad comprises a notification that is delivered to at least one of the first customer mobile device and the second customer mobile device by sending a message over at least one of the first secondary channel and the second secondary channel from the primary device.

9. The method of claim 8, wherein detecting the first and second customer mobile devices within proximity of the primary device is used to infer a first customer presence and second customer presence within proximity of the primary device.

10. The method of claim 8, wherein at least one of the first targeted ad and the second targeted ad is delivered to at least one of the first customer mobile device and the second customer mobile device using a long range wireless connection when the at least one of the first customer mobile device and the second customer device is not detected within proximity of the primary device.

11. The method of claim 8 further comprising detecting a customer action related to some program content, wherein the customer action is any action taken using the primary device controls while the program content is delivered to the primary device.

12. The method of claim 11, wherein at least one of the first targeted ad and the second targeted ad is delivered to at least one of the first customer mobile device and the second customer mobile device when detecting the customer action related to some program content.

\* \* \* \* \*